United States Patent [19]

Feres

[11] Patent Number: 5,755,924
[45] Date of Patent: May 26, 1998

[54] APPARATUS FOR TREATING LIQUID PRODUCTS

[76] Inventor: Vaclav Feres, 5104 Sunnydale Cir. N., Sarasota, Fla. 34233

[21] Appl. No.: 701,875

[22] Filed: Aug. 23, 1996

[30] Foreign Application Priority Data

Sep. 2, 1995 [DE] Germany .................. 195 32 497
Oct. 26, 1995 [DE] Germany .................. 195 39 886

[51] Int. Cl.$^6$ .................. B01D 1/22; B01D 19/02
[52] U.S. Cl. .................. 159/6.3; 159/28.6; 159/DIG. 8; 159/DIG. 16; 261/84; 96/177; 96/208; 202/236
[58] Field of Search .................. 159/6.1, 6.3, 28.6, 159/DIG. 8, DIG. 16; 261/84; 165/88, 86; 202/236; 203/89; 96/155, 177, 208

[56] References Cited

U.S. PATENT DOCUMENTS

| | | | |
|---|---|---|---|
| 2,941,872 | 6/1960 | Pilo et al. | 422/259 |
| 4,202,846 | 5/1980 | Shafranovsky et al. | 261/142 |
| 5,045,155 | 9/1991 | Ramsland | 202/174 |
| 5,084,133 | 1/1992 | Guy et al. | 159/47.1 |
| 5,254,219 | 10/1993 | Feres | 159/6.1 |
| 5,259,927 | 11/1993 | Feres | 159/6.1 |
| 5,264,079 | 11/1993 | Feres | 159/6.1 |
| 5,334,290 | 8/1994 | Nuns et al. | 202/205 |
| 5,411,640 | 5/1995 | Ramsland | 202/174 |
| 5,534,118 | 7/1996 | McCutchen | 202/205 |

*Primary Examiner*—Nina Bhat
*Attorney, Agent, or Firm*—Antonelli, Terry, Stout, & Kraus, LLP

[57] ABSTRACT

An apparatus, e.g. centrifugal evaporator, has at least one rotary treatment surface, e.g. a heated evaporating surface, which rises outwards from the rotation axis, a liquid feed in the vicinity of the lowest point of the treatment surface close to the rotation axis and a product removal on the periphery of the treatment surface. Such an apparatus is characterized in that the treatment surface over at least part of its axial length has a stepped construction and each step has a step angle of approximately 90°. Thus, as desired, a laminar or turbulent flow is possible. Through the construction of the steps it is possible to widely vary the nature of the flow and consequently the heat and material exchange, as well as the residence time of the liquid.

16 Claims, 3 Drawing Sheets

APPARATUS FOR TREATING LIQUID PRODUCTS

FIELD OF THE INVENTION

The invention relates to an apparatus for treating liquid products in a centrifugal field, comprising a rotor rotating about an axis and having a base, a wall forming a treatment surface and rising outwards from the base, at least one product feed issuing close to the base and a product removal located close to the periphery of the rotor.

BACKGROUND OF THE INVENTION

Apparatuses with the aforementioned construction are used for mixing, emulsifying, suspending and dispersing fine particles in liquids, as well as for defoaming or degassing liquids and finally for evaporation and distillation. They are widely used in centrifugal evaporator form and consequently reference is made in exemplified manner hereinafter to this design.

Centrifugal evaporators have smooth and conical evaporating surfaces and operate according to the thin film principle. The starting product fed in in the centre spreads in film-like manner over the evaporating surface due to the centrifugal action and is gradually thickened during the heat and material exchange which takes place to form a concentrate, which is removed at the periphery of the evaporating surface. The film thickness on the evaporating surface, in the case of a predetermined feed quantity, can largely be determined by the speed of the evaporating surface or can be varied by modifying the feed quantity.

The evaporation capacity of such a centrifugal evaporator is determined by the heat transmission coefficient, evaporating surface and temperature difference between the heating medium and the product film evaporation temperature. If it is not possible to reach the necessary final concentration with a single evaporating surface and a single pass, several evaporating surfaces are axially superimposed and the concentrate delivered at the periphery of one evaporating surface is charged onto the next evaporating surface (U.S. Pat. No. 4,683,026). Therefore concentration takes place in several successive stages. Such a multistage evaporator permits a continuous operation.

Another possibility for increasing concentration is provided by the recirculation evaporator (U.S. Pat. No. 5,254,219, GB 2 134 803). In this evaporator type the concentrate removed at the periphery is collected and once again charged into the centre of the evaporating surface. Thus, concentration takes place in several circulations and such evaporators operate discontinuously.

The capacity of such a centrifugal thin film evaporator is limited by the following phenomena. The liquid is guided in laminar flow over the evaporating surface. The heat exchange between the heated evaporating surface and the liquid is essentially limited to heat conduction and is consequently dependent on the thermal conductivity of the liquid, whilst the material exchange is limited to molecular diffusion. The degassing, defoaming, deodorizing and desorbing desired or necessary with many products can all only be inadequately obtained in the case of laminar flow.

As a result of the surface increase from the inside to the outside, the liquid film thickness decreases outwards. There is consequently a risk of the liquid film tearing in the outer areas and the liquid running in streak form over the surface, so that the product is overheated. This can in turn lead to damage or destruction of the product, as well as to baking and sticking effects and consequently to the contamination of the evaporating surface. These disadvantages more particularly occur in the case of strong thickening, i.e. pronounced concentration rise in the outwards direction.

If such apparatuses with rotary, conical surfaces are used for mixing, emulsifying, suspending or dispersing, the efficiency of such processes is decisively dependent of a closed product film forming over the entire treatment surface in order to ensure material exchange. In addition, an only laminar flow of the product film leads to an inadequate efficiency. This more particularly applies if the components of the mixture have widely varying densities, because the rotor operates in the manner of a separator and the components run in superimposed layers over the treatment surface.

The problem of the invention is to so construct an apparatus with rotating rotor that a greater efficiency is attained, so that in mixing processes there is a more effective thorough mixing with the same efficiency, in the case of evaporators an increased surface capacity and, if necessary, an effective degassing or defoaming of the product is obtained.

SUMMARY OF THE INVENTION

According to the invention this problem is solved in that the treatment surface, at least over part of its axial length, is given a stepped construction and each step has a step angle of approximately 90°.

The stepped construction of the treatment surface over at least part of the axial length thereof, leads to a significant rise in the surface capacity, which is due to the fact that the following process takes place on each step. The liquid runs in a substantially laminar manner over the roughly vertical portion of each step, is reflected and then forms a vortex leading to the formation of a turbulent flow. The liquid within the step forms a roughly parabolic surface with a turbulent core flow and runs on the upper end of the step in approximately laminar manner over the next higher step edge. Due to the turbulent flow within the partial volumes of the liquid in each step, there is a significant improvement to the heat and material exchange compared with a purely laminar flow. In addition, the turbulent flow aids degassing, defoaming and deodorizing.

The nature of the flow on each step can be decisively influenced by the speed. Whereas in the case of lower speed ranges the liquid substantially fills the step and the said parabolic surface in the case of an only moderate turbulence increases in the liquid core, with increasing speed the liquid volume within each step decreases, but simultaneously the turbulence increases.

It is admittedly known in connection with thin film evaporators (U.S. Pat. No. 4,153,500=DE 24 09 502) to graduate or make wavy the very thin evaporating surface for good heat transfer reasons, so as to give the same a higher bearing strength, but the profiling is deliberately made very shallow, so as to ensure a laminar thin film flow.

The steps can be constructed in a conventional manner, i.e. from a portion which is substantially perpendicular to the rotation axis, i.e. runs substantially horizontally, and a further portion extending substantially parallel to the rotation axis and therefore substantially vertically.

The residence time of the liquid on each step and the flow which is obtained there can be influenced by the construction of the steps. For example, one portion of the step can be at an angle with respect to the perpendicular to the rotation axis. If the angle is positive, i.e. there is a slight rise in the step from the inside to the outside, the liquid flows away faster in the form of a laminar flow. However, if the angle is negative, the step surface drops away outwards and the residence time of the liquid on each step is increased, because the step forms a type of liquid bag.

Similar effects can also be obtained by substantially vertical portions of each step or individual steps being inclined by an angle $\beta$ with respect to the rotation axis. If the angle $\beta$ is negative, the liquid volume increases, as does the residence time of the liquid in the step, whereas the liquid flows away faster when there is a positive angle $\beta$.

Finally, the residence time of the liquid and therefore the material and heat exchange in the turbulent area can be influenced by the geometrical size of the steps, namely by their rdial length $\Delta R$ and their axial height $\Delta L$. The smaller the ratio $\Delta R/\Delta L$, the longer the residence time of the liquid on each step.

The nature of the flow, i.e. laminar or turbulent, can be influenced by the radius of curvature r at the transition between the horizontal and vertical portions. The greater the radius of curvature, the earlier a laminar flow is obtained at the step transition, whereas a smaller radius of curvature leads to a tearing away of the flow at the edge.

As a function of the nature of the product and the desired action, it can be advantageous if the treatment surface is given a step-like profiling on part of its axial length, but is smooth-walled in the remaining area.

The smooth-walled part can be located in the upper area. In this construction, there is a great concentration or thickening of the product in the lower area in the case of an evaporator, due to the turbulent flow in the step spaces, whereas in the upper evaporator area with the smooth-walled evaporating surface there is a substantially laminar flow, which leads to a gentle treatment of the previously concentrated product until the final concentration is reached. A reverse arrangement, i.e. smooth-walled at the bottom and step-shaped at the top, can be recommended during stripping.

The steps of the stepped treatment surface can be such that the radially inner edges or the radially outer corners of the steps are located on a paraboloid, i.e. have a gradient increasing from the inside to the outside or from the bottom to the top.

In a preferred construction, the rotor is housed in a closed container and the rotation axis passes -outwards through the container, so that the treatment of the liquid takes place under controlled environmental conditions.

The inventively constructed apparatus can, as stated, be used for mixing (emulsifying, suspending and dispersing), as well as for degassing and defoaming. In the case of mixing the components forming the mixture can be jointly supplied via the product feed. However, instead of this, the components can in each case be supplied by means of a separate product feed. It can be advantageous in this case if the product feeds issue with different axial spacings with respect to the bottom.

For evaporation processes and for the treatment of products having a higher viscosity or which only pass into the liquid phase at elevated temperature, the apparatus is preferably so constructed that the wall forming the treatment surface is heated.

When the apparatus is used as a centrifugal evaporator, preferably the rotor has a roughly cylindrical casing in which is inserted the wall forming an evaporator surface and the space between the casing and the evaporator surface forms a heating zone. A vaporous heat carrier is preferably fed into the heating zone.

The heat carrier condensing in droplet form on the stepped outside of the evaporating surface is centrifugally accelerated and hurled off due to the rotation of the rotor and strikes against the opposite inside of the outer wall of the rotor and runs downwards there. Due to the stepped construction, dropwise condensation starts at a much lower speed than in the case of a smooth-walled evaporating surface.

The inventive construction of the evaporating surface not only leads to the aforementioned thermodynamic and aerohydrodynamic advantages, but for the same diameter also leads to a significant increase in the active surface during evaporation.

An evaporator constructed in this way can be used not only for concentrating or thickening random liquids, particularly organic liquids, but e.g. also for the biosynthesis of polysaccharides, for the polycondensation of polyesters, etc.

BRIEF DESCRIPTION OF THE DRAWINGS

The invention is described in greater detail hereinafter relative to embodiments and the attached drawings, wherein show.

DETAILED DESCRIPTION OF EMBODIMENTS

Figure 1:
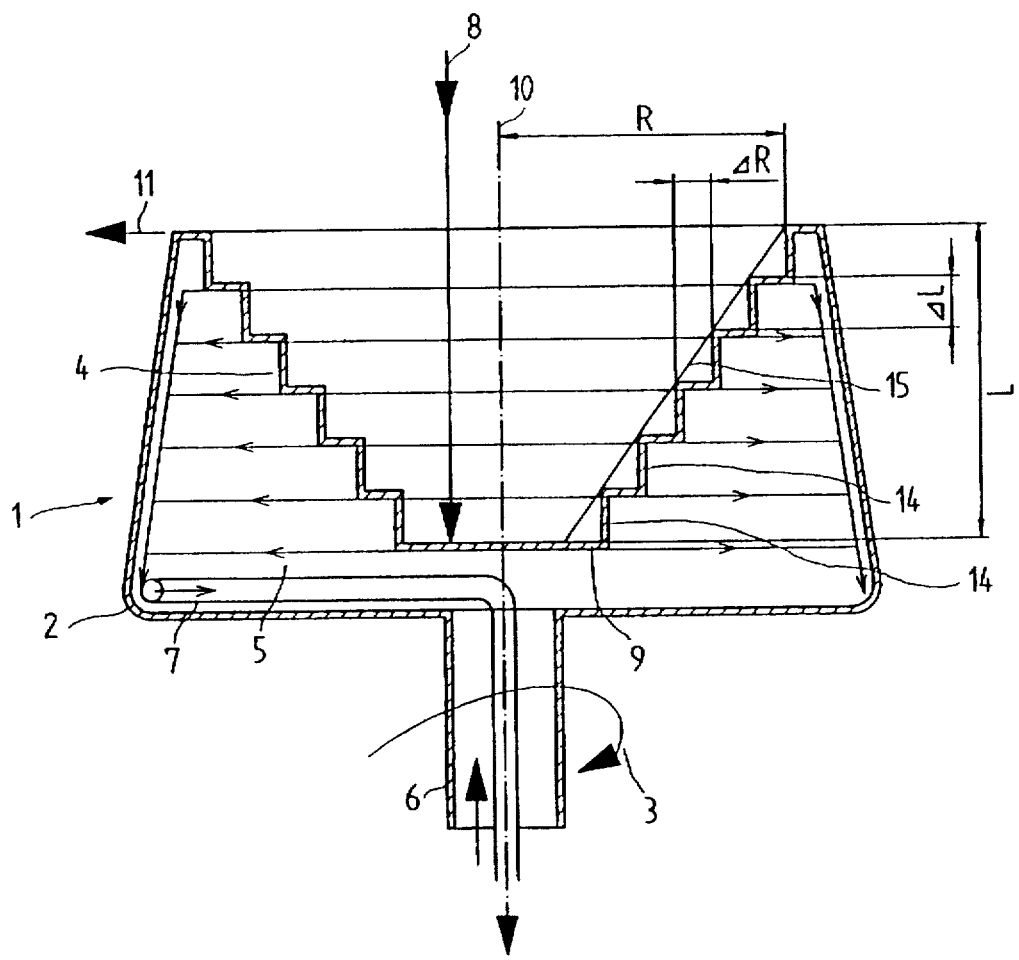
FIG. 1 A diagrammatic section through the rotor of a centrifugal evaporator.

FIG. 1 shows an evaporator 1 in a diagrammatic section. The evaporator 1 has a rotor 2, which rotates in a not shown container in accordance with the arrow 3.

As the treatment surface 4 the rotor 2 has an evaporating surface, which upwardly bounds a heat carrier zone 5. The preferably vaporous heating medium is fed, e.g. by means of the connector 6, into the heat carrier zone and the condensate leaves the latter via a skimming tube 7. With the connector 6 the rotor 2 is rotatably mounted in the bottom of the not shown, closed container.

The product to be concentrated or thickened is fed into the centre of the rotationally symmetrical evaporating surface in accordance with the direction arrow 8 and close to the rotation axis is supplied to the base 9 of the evaporating surface. The product is centrifugally accelerated and then flows upwards, accompanied by increasing concentration, onto the evaporating surface and on the periphery thereof, in accordance with the direction arrow 11 is delivered in concentrate form or is removed by the skimming tube, whilst the vapours are trapped in the container and led off.

The evaporating surface has a stepped construction and comprises several steps 14, which are arranged in rising manner with increasing distance R from the rotation axis. The inner edges of the steps 14 are located on an envelope surface 15, which forms a conical surface, a paraboloid or a random other, third order surface. The depth of the steps is designated $\Delta R$, the height of the steps $\Delta L$, L being the axial height of the evaporating surface.

Figure 2:
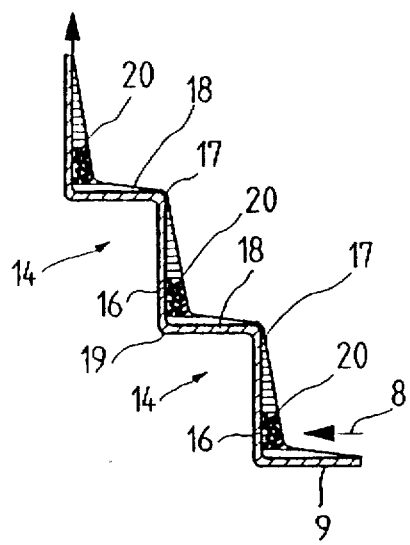
FIG. 2 A larger scale partial section of the evaporating surface of FIG. 2.

A mixed flow with a preponderantly turbulent fraction is formed on the evaporating surface, as can be seen in FIG. 2. The liquid charged at 8 is centrifugally accelerated on the base 9 of the evaporating surface due to the rotation of the rotor 2 and strikes the substantially vertical portion 16 of the first step 14. The liquid is decelerated and reflected there, so that a turbulent flow forms along the vertical portion and only passes into a laminar flow in the upper area of the vertical portion 16 in the vicinity of the inner step edge 17 and this is continued on the substantially horizontal step portion 18, so that in the vicinity of the outer corner 19 or vertical portion 16 of the next step 14 it is again decelerated.

Thus, at each vertical portion 16 of each step 14, a turbulent flow forms in area 20 which, as a function of the rotor speed, has a more or less large, radial thickness. This radial thickness of the turbulent flow decreases towards the inner step edges 17 and in certain circumstances passes into a laminar flow there, which still exists on the following, horizontal portion 18.

The residence time of the liquid on each individual step can not only be influenced by the speed of the rotor 2, but also by the geometrical construction of the steps. Thus, the residence time on each step is greater, the greater the ratio $\Delta L/\Delta R$ (cf. FIG. 1) of the steps, it being assumed that the vertical portions 16 run parallel to the rotation axis and the horizontal portions 18 perpendicular thereto.

Figure 3:
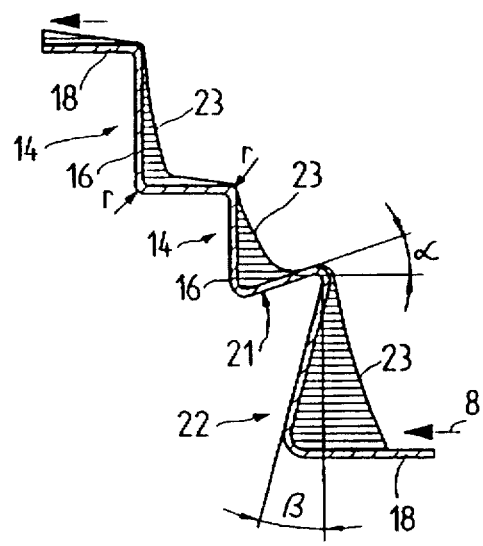
FIG. 3 A partial section corresponding to FIG. 2 of another embodiment of the evaporating surface.

A further possibility for influencing the residence time and flow conditions is shown in FIG. 3. Whilst the top step 14 is constructed in the same way as in FIG. 2, the step 14 below it has an axially parallel, vertical portion 16 and a portion 21, which is inclined with respect to the perpendicular to the rotation axis 10 by the angle $\alpha$. This leads to the formation of a type of bag in which can collect a larger liquid quantity. An even longer liquid residence time on each step can occur if, as intimated at the bottom step, the side member 22 of the step 14 is at an angle $-\beta$ with respect to the rotation axis. The liquid accumulating in the steps 14 assumes a parabolic surface 23.

As can be concluded from FIG. 3, the residence time of the liquid on each step, compared with the arrangement according to FIG. 2, can be reduced in that the horizontal portions are at an angle $+\alpha$ and/or the vertical portions at an angle $+\beta$. The two constructional measures can also be combined.

In the case of the embodiment according to FIG. 1 the corners of the steps are on a conical surface 15. However, as can also be gathered from FIG. 1, in the case of a parabolic envelope surface, the height $\Delta L$ of the steps and therefore the residence time of the liquid increases from bottom to top. If necessary, it can also be appropriate to zonally give a smooth-walled construction to the evaporating surface.

Finally, the nature of the flow at the transition from the substantially horizontal portions 18 into the vertical portions 16 can be influenced by the radius of curvature r. The greater said radius of curvature, the earlier a laminar flow is obtained at the transition, whereas the flow tends to tear away or become turbulent if the radius of curvature r is very small.

The vaporous heating medium in the heat carrier zone 5 condenses in droplet form on the outside of the stepped evaporating surface. Due to the rotation of the rotor 2 the droplets are hurled away centrifugally, as indicated by the direction arrows, and strike against the inside of the outer wall of the rotor 2, where they run downwards and the condensate collecting close to the bottom of the rotor is taken up by the skimming tube 7 and passed outwards through the connector 6.

Figure 4:
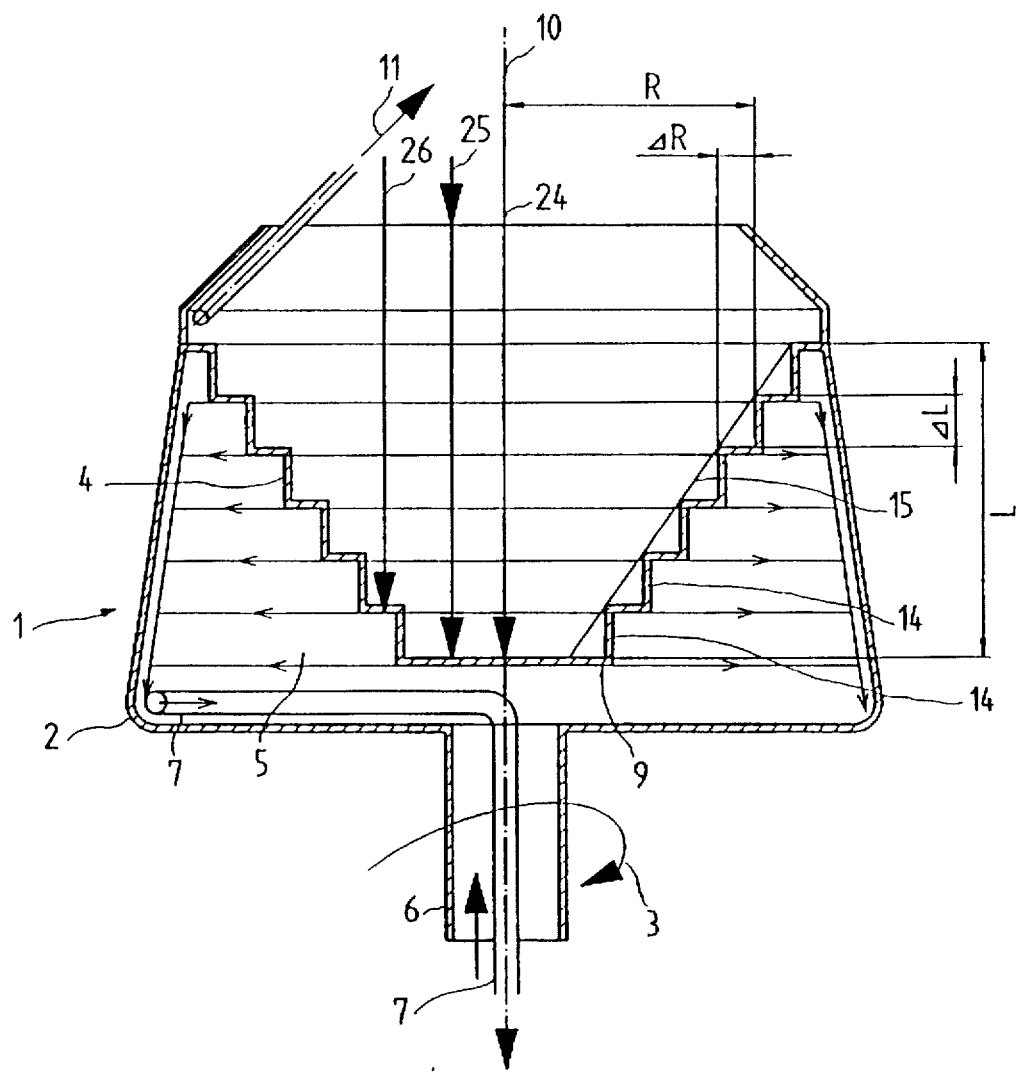
FIG. 4 A diagrammatic view of the rotor of a mixer.

FIG. 4 shows an embodiment of a mixer for mixing, emulsifying or suspending liquids with one another or for dispersing particles in liquid. Here again the rotor 2 has a heating zone 5 in order to be able to mix viscous products or those which are pasty at ambient temperature and which are only adequately fluid at elevated temperature. In the embodiment shown the mixture consists of three components. Two components, as indicated by the arrows 24 and 25, are charged onto the base 9 of the treatment surface 4, whereas the third component, indicated by the arrow 26, is supplied to the first step 14. The finished mixture is then removed with a skimming tube on the periphery of the stepped treatment surface 4.

The rotary treatment surface can additionally or exclusively be used for degassing or defoaming liquid products, because as a result of the centrifugal field a separation of liquid and gas takes place.

I claim:

1. Apparatus for the treatment of liquid products in a centrifugal field, comprising a rotor rotating about an axis and having a base, a wall forming a treatment surface and rising outwards from said base, at least one product feed issuing close to the base and a product removal located close to the periphery of the rotor, wherein at least over part of its axial length the wall has a stepped construction and each step has a step angle of approximately 90°.

2. Apparatus according to claim 1, wherein one portion of each step runs substantially perpendicular to the rotation axis of the rotor and the other portion substantially parallel to said rotation axis.

3. Apparatus according to claim 2, wherein the one portion of at least some of the steps is inclined by an angle with respect to the perpendicular to the rotation axis.

4. Apparatus according to claim 2, wherein the other portion of at least some of the steps is at an angle to the rotation axis.

5. Apparatus according to claim 1, wherein the radial length $\Delta R$ of the steps is variable.

6. Apparatus according to claim 1, wherein the axial height $\Delta L$ of the steps is variable.

7. Apparatus according to claim 1, wherein the radius of curvature r at the transition between one portion of the steps running substantially perpendicular to the rotation axis of the rotor and another portion running substantially parallel to said rotation axis is variable.

8. Apparatus according to claim 1, wherein over part of its axial length the wall has a stepped profiling, but in the remaining area is smooth.

9. Apparatus according to claim 1, wherein the radially inner edges or the radially outer corners of the steps are located on a paraboloid.

10. Apparatus according to claim 1, wherein the rotor is located in a closed container and the rotation axis passes outwards through the container.

11. Apparatus according to claim 1, wherein it is used for mixing, dispersing, degassing or defoaming.

12. Apparatus according to claim 11, the apparatus is mixer, wherein the components forming the mixture are jointly supplied via the product feed.

13. Apparatus according to claim 11, the apparatus is mixer, wherein the components forming the mixture are in each case supplied by a separate product feed.

14. Apparatus according to claim 13, wherein the product feeds issue with different axial distances with respect to the base.

15. Apparatus according to claim 1, wherein the wall forming the treatment surfaces is heated.

16. Apparatus according to claim 15, the apparatus is a centrifugal evaporator, and wherein the rotor has an approximately cylindrical casing in which is inserted the wall forming an evaporator surface and the space between the casing and the evaporator surface forms a heating zone.

* * * * *